United States Patent
Wada et al.

(10) Patent No.: US 6,972,933 B1
(45) Date of Patent: Dec. 6, 2005

(54) HEAD SUSPENSION ASSEMBLY

(75) Inventors: Takeshi Wada, Tokyo (JP); Kenji Inage, Tokyo (JP); Masashi Shiraishi, Tokyo (JP); Haruyuki Morita, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/419,793

(22) Filed: Oct. 18, 1999

(30) Foreign Application Priority Data

Oct. 19, 1998 (JP) .................................. 10/313955

(51) Int. Cl.[7] .......................................... G11B 5/127
(52) U.S. Cl. ..................................................... 360/323
(58) Field of Search .............................. 360/323, 125, 360/126, 121

(56) References Cited

U.S. PATENT DOCUMENTS

| | | | |
|---|---|---|---|
| 5,465,186 A | 11/1995 | Bajorek et al. | 360/323 |
| 5,748,412 A * | 5/1998 | Murdock et al. | 360/323 |
| 5,903,415 A * | 5/1999 | Gill | 360/323 |
| 6,163,437 A * | 12/2000 | Inage et al. | 360/128 |
| 6,233,127 B1 * | 5/2001 | Shimazawa | 360/323 |
| 6,704,173 B1 * | 3/2004 | Lam et al. | 360/323 |
| 6,891,702 B1 * | 5/2005 | Tang | 360/323 |
| 2005/0105220 A1 * | 5/2005 | Iben | 360/323 |

FOREIGN PATENT DOCUMENTS

| | | |
|---|---|---|
| JP | 07-085422 | 3/1995 |
| JP | 7-085422 | 3/1995 |
| JP | 7-141636 | 6/1995 |
| JP | 10-269534 | 10/1998 |

* cited by examiner

*Primary Examiner*—Allen Cao
(74) *Attorney, Agent, or Firm*—Arent Fox, PLLC.

(57) ABSTRACT

A head suspension assembly includes a magnetic head slider with at least one thin-film magnetic head element, a support member for supporting the magnetic head slider at a top end portion thereof, a drive circuit electrically connected to the at least one thin-film magnetic head element, and at least two diode elements connected toward one direction in parallel with terminals which are connected across the at least one thin-film magnetic head element. Each of the diode elements has a turn-on voltage higher than the maximum output voltage of the at least one thin-film magnetic head element.

13 Claims, 7 Drawing Sheets

HEAD SUSPENSION ASSEMBLY

FIELD OF THE INVENTION

The present invention relates to a head suspension assembly used for a magnetic disk device.

DESCRIPTION OF THE RELATED ART

In this kind of magnetic disk device, a magnetic head slider attached in a top end of a suspension flies above the surface of the rotating magnetic disk, and recording of the information on a magnetic disk and/or reproducing of the information from the magnetic disk are performed by a thin-film magnetic head element carried in this flying magnetic head slider.

In connection with recent requirement for a larger capacity and higher data storage density of a magnetic disk device, the thin-film magnetic head element needs higher reading sensitivity. Generally, current proof capacity of the thin-film magnetic head element which realizes such a high reading sensitivity is extremely small.

For this reason, if over-current due to electrostatic discharge (ESD) from a worker who deals with the magnetic head slider is applied to the magnetic head element or if unintentional over-current during measurement or evaluation process is applied to the magnetic head element, property degradation of the magnetic head element may be induced. In the worst case, ESD destruction of this magnetic head element may occur.

As a technique for preventing such electrostatic destruction in a composite type magnetic head having both an inductive recording element and a magnetoresistive (MR) reproducing element, Japanese unexamined patent publication No. 7-85422 discloses a connection of a member with $10^3$–$10^9$ $\Omega$ cm between the inductive element and the MR element and bidirectional connection of two diodes between terminals connected across the MR element.

Also, as a technology for preventing the ESD destruction in a composite type magnetic head, Japanese unexamined patent publication No. 7-141636 discloses that signal reading terminals of a flexible printed circuit board (FPC) which electrically connects this magnetic head with an electrical circuit of a magnetic disk device during manufacture and assembly processes of the magnetic head are shunted by a short circuit and that this short circuit is opened by cutting the FPC before the characteristics measurement process after the assembly process.

Furthermore, as a technology for preventing ESD destruction of a composite type magnetic head, U.S. Pat. No. 5,465,186 discloses that terminals of MR elements are shunted by lead wires during the manufacture and the assembly operation of magnetic heads, then two diode are biderectionally connected to each lead wire in parallel during the assembly operation, and thereafter the lead wires are cut so that the biderectional diodes are remained under the parallel connection with each of the MR elements.

However, according to the conventional technology for preventing ESD destruction disclosed in Japanese patent unexamined publication No. 7-85422, since it is necessary to provide a low resistor member for short-circuiting between the inductive element and the MR element during the manufacturing process of the magnetic head, the manufacturing process becomes complicated. Moreover, since only one diode is connected in one direction in each head, sufficient safety measure against ESD problems cannot be expected.

It should be noted that magnetic characteristics of a giant magnetoresistive effect (GMR) element with a high sensitivity such as for example a spin valve MR element will easily change with extremely smaller ESD energy than an energy value which will induce electrostatic destruction. Thus, according to this conventional technology for preventing the ESD destruction, it is impossible to prevent such change in electromagnetic conversion characteristics.

Also, according to the conventional technology for preventing ESD destruction disclosed in the Japanese patent unexamined publication No. 7-141636, it is necessary to separately make safety provisions against ESD problems which will be generated after the characteristics measurement process.

Furthermore, according to the conventional technology for preventing ESD destruction disclosed in U.S. Pat. No. 5,465,186, it is necessary to perform a difficult working of cutting and opening the short-circuit part. In addition, since only one diode is connected toward one direction in this conventional technology, sufficient ESD provisions is not expectable.

As aforementioned, the magnetic characteristics of a GMR element such as for example a spin valve MR element will easily change with extremely smaller ESD energy than an energy value which will induce ESD destruction. This conventional technology cannot prevent such change in electromagnetic conversion characteristics.

SUMMARY OF THE INVENTION

It is therefore an object of the present invention to provide a head suspension assembly which can prevent certainly degradation of electromagnetic conversion characteristics of a thin-film magnetic head element due to ESD.

According to the present invention, a head suspension assembly includes a magnetic head slider with at least one thin-film magnetic head element, a support member for supporting the magnetic head slider at a top end portion thereof, a drive circuit electrically connected to the at least one thin-film magnetic head element, and at least two diode elements connected toward one direction in parallel with terminals which are connected across the at least one thin-film magnetic head element. Each of the diode elements has a turn-on voltage higher than the maximum output voltage of the at least one thin-film magnetic head element.

Two or more diode elements are connected toward one direction in parallel with the thin-film magnetic head element. Thus, over-current caused by ESD is shunted by the two or more diode elements and therefore current flowing through the thin-film magnetic element extremely decreases resulting ESD proof characteristics of the head suspension assembly to dramatically improve.

It is preferred that each of the diode elements is a diode element having a turn-on response speed equal to or less than 1.5 nanoseconds.

It is also preferred that the drive circuit and the at least two diode elements are formed within an IC chip.

It is preferred that the IC chip is mounted on the support member, or that the IC chip is mounted on a printed circuit board extended from the support member.

It is also preferred that the at least one thin-film magnetic head element includes only a magnetoresistive effect element, or includes an inductive recording element and a magnetoresistive effect reproducing element.

The magnetoresistive effect element may be an anisotropic magnetoresistive effect element, a GMR element or a TMR (tunneling magnetoresistive effect) element.

In general, in the GMR element or the TMR element, change in its electromagnetic conversion characteristics, for example pin direction inversion, will occur even if relatively small current such as 20 mA flows through the element. However, according to the present invention, since current is shunted by the two or more diode elements connected in parallel with the element and therefore current flowing through the GMR element or the TMR element extremely decreases. Thus, it can be expected that ESD proof of its electromagnetic conversion characteristics greatly improves.

Further objects and advantages of the present invention will be apparent from the following description of the preferred embodiments of the invention as illustrated in the accompanying drawings.

DESCRIPTION OF THE PREFERRED EMBODIMENTS

Figure 1:
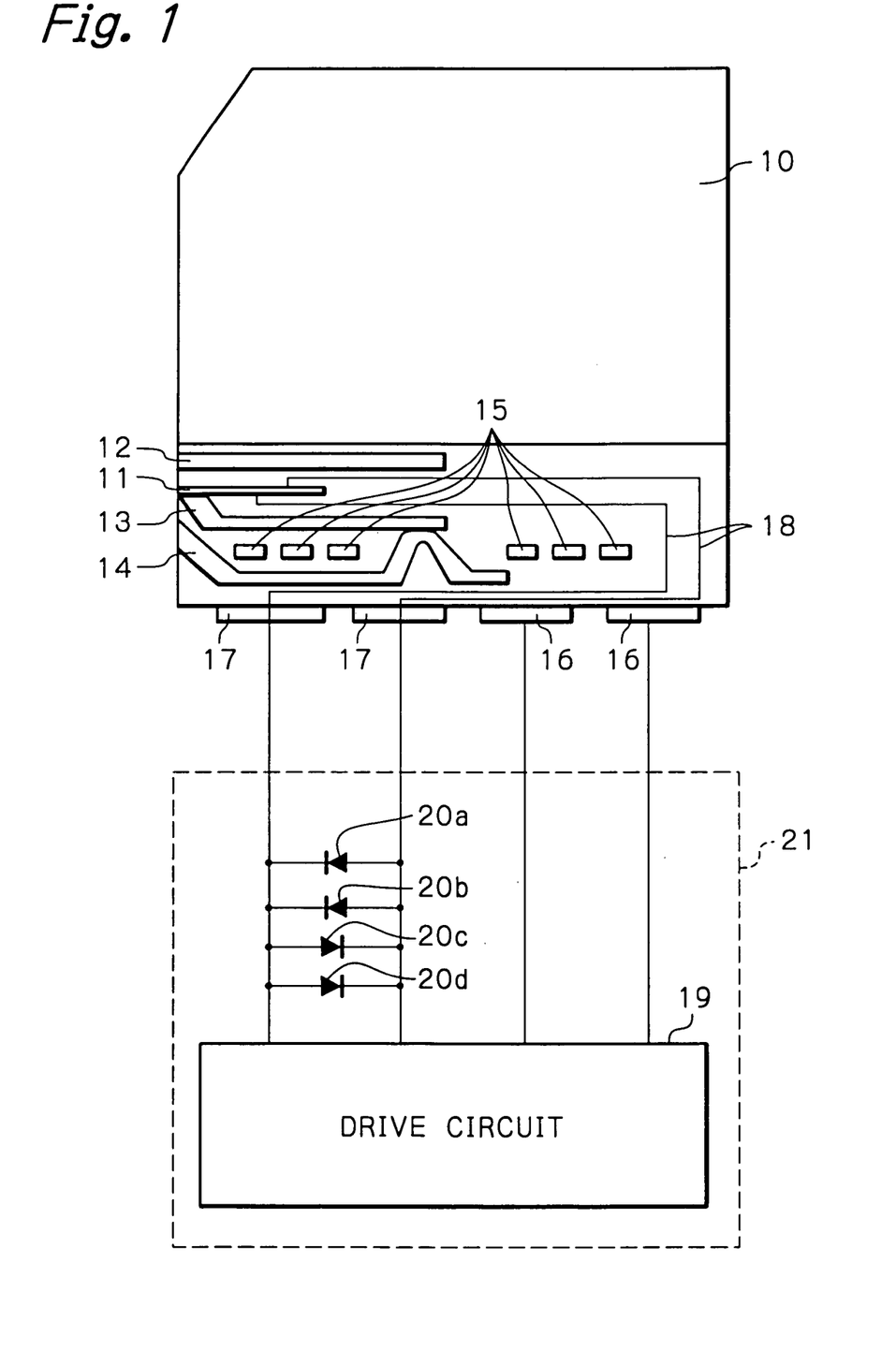
FIG. 1 is a sectional view schematically showing the structure of a composite type magnetic head with a spin valve MR element and an inductive element and its drive circuit of a head suspension assembly as a preferred embodiment according to the present invention.

FIG. 1 schematically illustrates the structure of a composite type magnetic head with a GMR reproducing element such as a spin valve MR element and an inductive recording element and its drive circuit of a head suspension assembly as a preferred embodiment according to the present invention.

In the figure, reference numeral 10 denotes a magnetic head slider, 11 a spin valve MR reproducing element, 12 a lower magnetic shield layer of the MR element 11, 13 a first thin-film magnetic core layer of the inductive recording element or an upper magnetic shield layer of the MR element 11, 14 a second thin-film magnetic core layer of the inductive element, 15 a coil of the inductive element, 16 a pair of terminal electrodes for the inductive element, 17 a pair of terminal electrodes for the MR element, 18 a pair of connection conductors for connecting both ends of the MR element 11 with the pair of terminal electrodes 17, and 19 a drive circuit or a head amplifier to which the pair of terminal electrodes 16 for the inductive element and the pair of terminal electrodes 17 for the MR element 11 are connected, respectively.

The above-mentioned constitution is the same as that of a general composite-type magnetic head. In the embodiment, however, between the pair of terminal electrodes 17 for the MR element 11, which are connected with the drive circuit 19, four diode elements 20a–20d are connected in parallel with each other. In fact, the drive circuit 19 and the diode elements 20a–20d are incorporated in one IC chip 21.

The diode elements 20a and 20b are connected between the pair of terminal electrodes 17 in one direction, but the diode elements 20c and 20d are connected between the pair of terminal electrodes 17 in the opposite direction. In other words, two diode elements are connected in parallel toward one direction.

Figure 2:
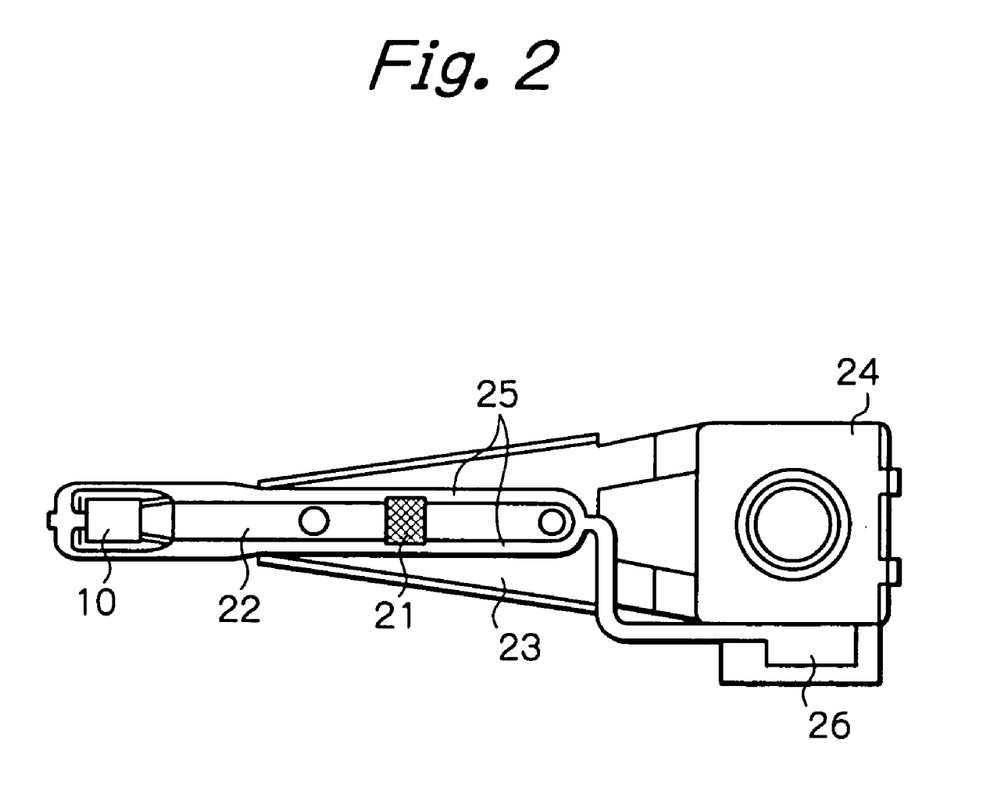
FIG. 2 is a plane view showing the whole head suspension assembly in the embodiment of FIG. 1.

FIG. 2 illustrates the whole head suspension assembly in the embodiment of FIG. 1.

In the figure, reference numeral 22 denotes a resilient flexure which carries the magnetic head slider 10 at its tongue portion located near its top end section, 23 a load beam which supports and fixes the flexure 22, and 24 a base plate formed at a base end section of the load beam 23, respectively.

On the flexure 22, an IC chip 21 of silicone semiconductor is mounted. In this IC chip 21, as aforementioned, the drive circuit or head amplifier 19 and the four diode elements 20a–20d are integrally formed as a single IC. Although it is a mere example, the size of the IC chip 21 is 1.0 mm×1.0 mm×0.25 mm. Moreover, the mounting position of the IC chip 21 is considered as the position near the magnetic head slider 10 on the suspension from the improvement in ESD-proof characteristics, from the improvement in an electromagnetic conversion characteristics, and from the ease in mounting.

On the flexure 22, two or more lead conductors 25 in the form of a flexible printed circuit board (FPC) as input/output signal lines are formed. One ends of these lead conductors 25 are connected to the above-mentioned terminal electrodes 16 and 17 of the magnetic head slider 10 formed at the top end portion of the flexure 22, and other ends of the lead conductors 25 are connected to connection pads 26 for connecting with an external circuit through the IC chip 21.

As is well known, the spin valve MR element has a multi-layered structure of two thin film layers of a ferromagnetic material magnetically separated by a thin film layer of non-magnetic metal material, and an adjacent layer of anti-ferromagnetic material formed in physical contact with one of the ferromagnetic material layers to provide exchange bias magnetic field by exchange coupling at the interface of the layers to this one ferromagnetic material layer ("pinned" layer). The magnetization direction in the pinned layer is constrained or maintained by the exchange coupling. On the other hand, the magnetization direction of the other ferromagnetic layer ("free" layer) is free to rotate in response to an externally applied measurement magnetic field. The direction of the magnetization in the free layer changes between parallel and anti-parallel against the direction of the magnetization in the pinned layer, and hence the magnetoresistive effect greatly changes and GMR characteristics are obtained.

The output characteristic of the spin valve MR read sensor depends upon the angular difference of magnetization between the free and pinned layers. The direction of the magnetization of the free layer is free to rotate in accordance with an external magnetic field. That of the pinned layer is fixed to a specific direction by the exchange coupling between the layer and adjacently formed anti-ferromagnetic layer.

However, the direction of the magnetization of the pinned layer may change or reversed (pin-inversion) if some heat or magnetic field is applied to this spin valve MR element by various reasons.

Figure 3:
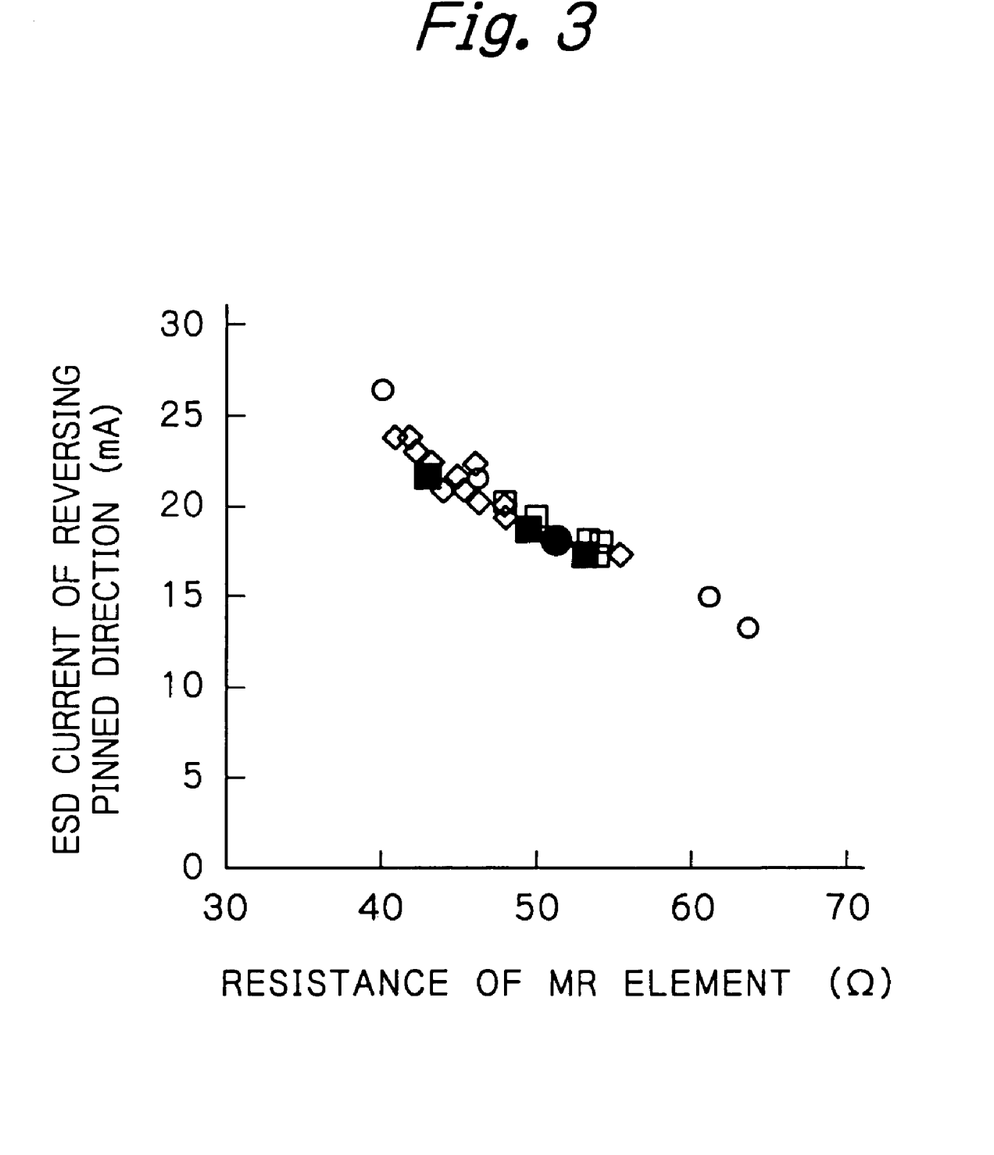
FIG. 3 is a graph illustrating relationship between a value of ESD current at which pin-inversion will occur and a resistance of a spin valve MR element.

For example, pin-inversion may occur by the Joule's heat and the magnetic field generated by ESD current. FIG. 3 illustrates relationship between a value of ESD current at which pin-inversion will occur and a resistance of a spin valve MR element. It will be apparent from the figure that, by the experiment using Human Body Model, pin-inversion of the spin valve MR element will occur if ESD current of 20 mA or more flows through the MR element with the resistance value of 50 Ω.

Thus, according to the present invention, a plurality of diode elements are connected to such a spin-valve MR element in parallel toward one direction so that ESD current of 20 mA or more never flows through this MR element.

Figure 4A:
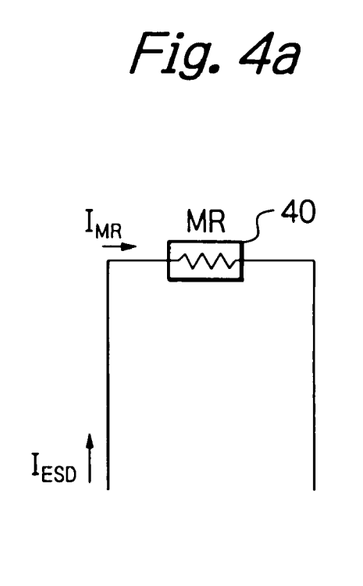
FIGS. 4a to 4d are circuit diagrams showing various circuit configurations with a MR element and a diode element or diode elements connected with the MR element in parallel.
Figure 4B:
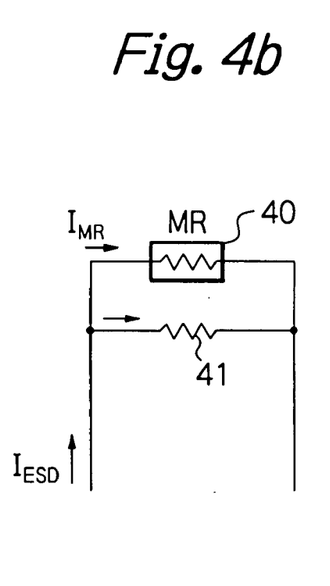
Figure 4C:
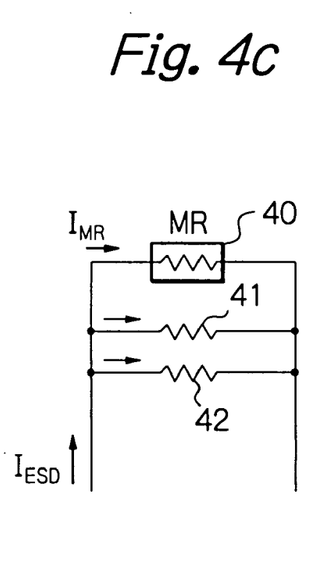
Figure 4D:
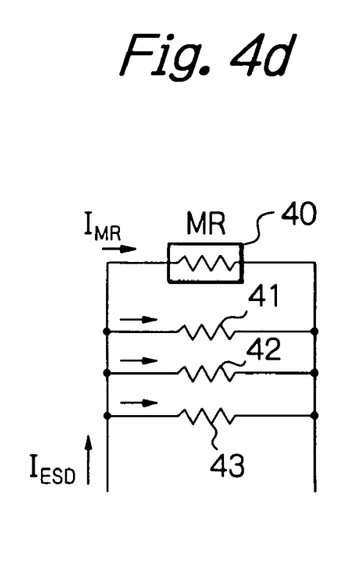

FIGS. 4a to 4d illustrate various circuit configurations with a MR element and a diode element or diode elements connected with the MR element in parallel. In detail, FIG. 4a illustrates the circuit configuration where no diode element is connected to the MR element 40, FIG. 4b illustrates the circuit configuration where a single diode element 41 is connected toward one direction in parallel with the MR element 40 as in the conventional art, FIG. 4c illustrates the circuit configuration where two diode elements 41 and 42 are connected toward one direction in parallel with the MR element 40 as in this embodiment, and FIG. 4d illustrates the circuit configuration where three diode elements 41–43 are connected toward one direction in parallel with the MR element 40.

Figure 5:
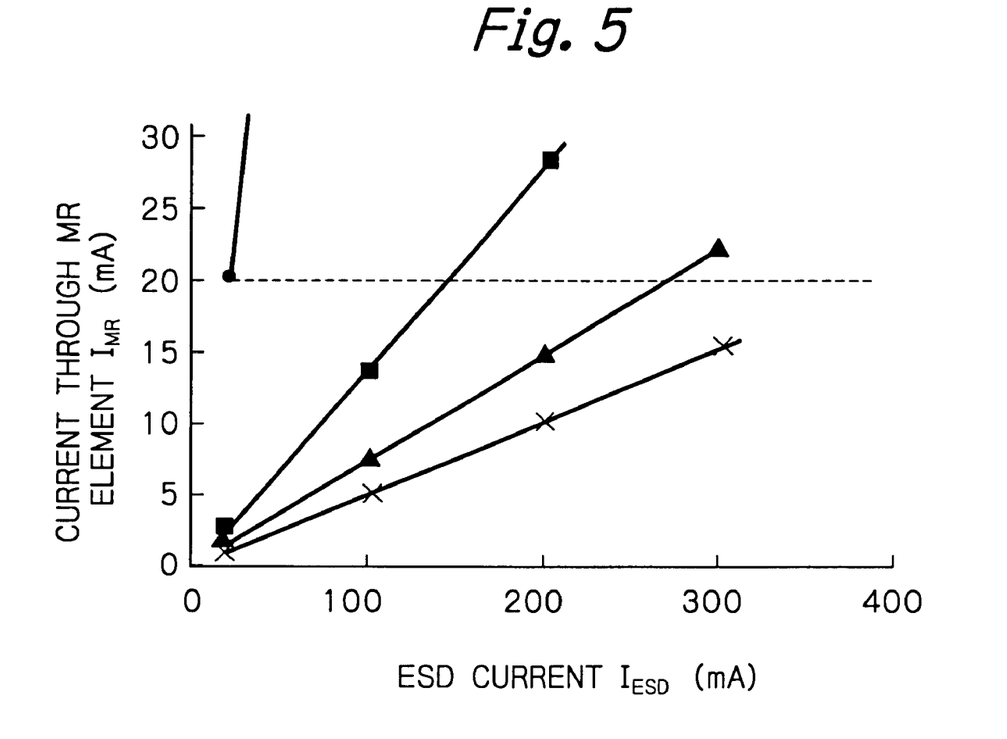
FIG. 5 is a graph illustrating relationship between ESD current and current which actually flows through the MR elements shown in FIGS. 4a to 4d, respectively.

Table 1 and FIG. 5 illustrate relationship between ESD current $I_{ESD}$ and current $I_{MR}$ which actually flows through the respective MR elements shown in FIGS. 4a to 4d, where the resistance value of each MR element is 50 Ω and the resistance value of each diode element when conductive is 8 Ω.

TABLE 1

| | MR current $I_{MR}$ (mA) | | | |
|---|---|---|---|---|
| ESD current $I_{ESD}$ (mA) | No diode (FIG. 4a) | Single diode (FIG. 4b) | Two diodes (FIG. 4c) | Three diodes (FIG. 4d) |
| 20.0 | 20.0 | 2.8 | 1.5 | 1.0 |
| 100.0 | 100.0 | 13.8 | 7.4 | 5.1 |
| 200.0 | 200.0 | 27.6 | 14.8 | 10.1 |
| 300.0 | 300.0 | 41.4 | 22.2 | 15.2 |

As will be understood from Table 1 and FIG. 5, in case of the no diode circuit configuration shown in FIG. 4a, the entire applied ESD current $I_{ESD}$ flows through the MR element as MR current $I_{MR}$. In case of the conventional circuit configuration shown in FIG. 4b, the MR current $I_{MR}$ will exceed 20 mA and the pin-inversion will occur when the ESD current $I_{ESD}$ becomes larger than about 150 mA.

Whereas, in case of the circuit configuration shown in FIG. 4c with the two diode elements 41 and 42 connected toward one direction in parallel with the MR element, until the ESD current $I_{ESD}$ becomes larger than about 270 mA, the MR current $I_{MR}$ never exceeds 20 mA and thus pin-inversion due to the ESD current never occurs. Also, in case of the circuit configuration shown in FIG. 4d with the three diode elements 41–43 connected toward one direction in parallel with the MR element, even when the ESD current $I_{ESD}$ becomes larger than about 300 mA, the MR current $I_{MR}$ never exceeds 20 mA and thus pin-inversion due to the ESD current never occurs.

As will be apparent that ESD-proof characteristics is sharply improved by connecting two or more diode elements in parallel with MR element toward one direction. Although the number of the diode elements which make parallel connection is two in this embodiment, the more number of the diode elements, the more decrease in the MR current is expected resulting ESD-proof characteristics to more improve.

It is necessary for operation characteristics of each diode element that its turn-on voltage is higher than the maximum output voltage of the MR element. Namely, in case of a MR element with a sense current of 10 mA and a resistance value of 50 Ω, the turn-on voltage of the diode element must be higher than 50×0.1=0.5 V.

Figure 6:
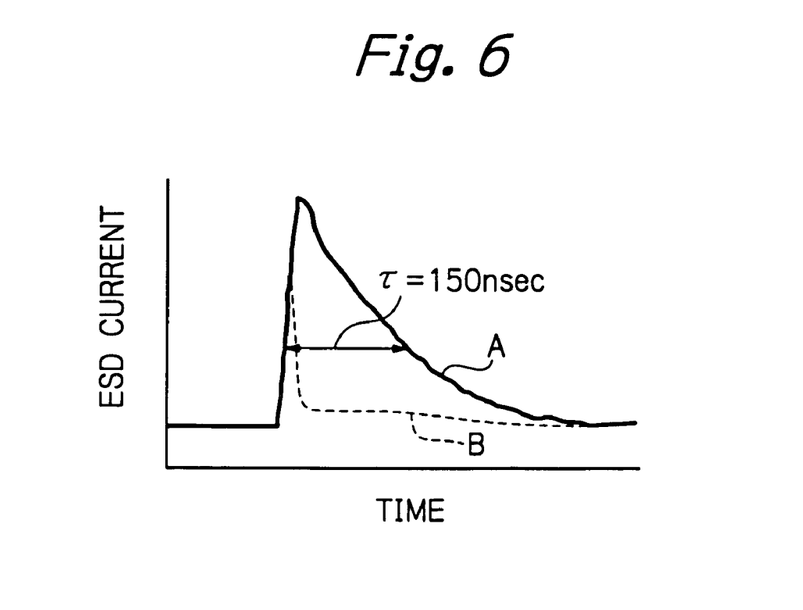
FIG. 6 is a graph illustrating wave shape of the ESD current by using Human Body Model.

Moreover, it is better as the turn-on response speed of the diode element is quicker and it is desirable that this speed is 1.5 nanoseconds or less. FIG. 6 illustrates wave shape of the ESD current by using Human Body Model. In the figure, the solid line A indicates the ESD current with no diode, and the dotted line B indicates the ESD current when the diode elements are connected in parallel. The sharp peak of this dotted line B is the leak current. This leak current is a signal quicker than the turn-on response speed of a diode element, and the quicker in the turn-on response speed of the diode element, the smaller peak of the leak current is resulted. In addition, there is a report that ESD destruction has occurred under the current application for 1.5 nanoseconds in CDM (Charged Device Model) which is one of the ESD models, and it is known that pin-inversion occurs under current smaller than the current which will invite ESD destruction. Therefore, it is requested that the turn-on response speed of the diode element is 1.5 nanoseconds or less.

There are various discrete diode elements which satisfy such conditions (for example, Toshiba diode 1SS362). The head suspension assembly of this embodiment can be realized by forming diode elements having a characteristics equivalent to this discrete diode into one IC chip.

Figure 7:
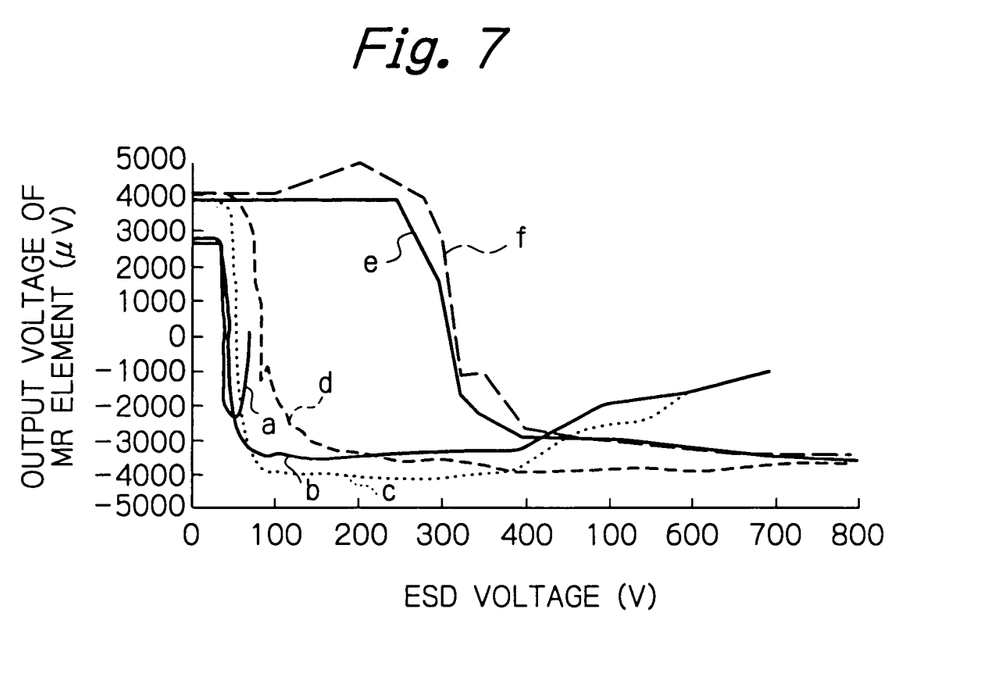
FIG. 7 is a graph illustrating output voltage characteristics against the ESD voltage of a spin valve MR element is shown.
Figure 8:
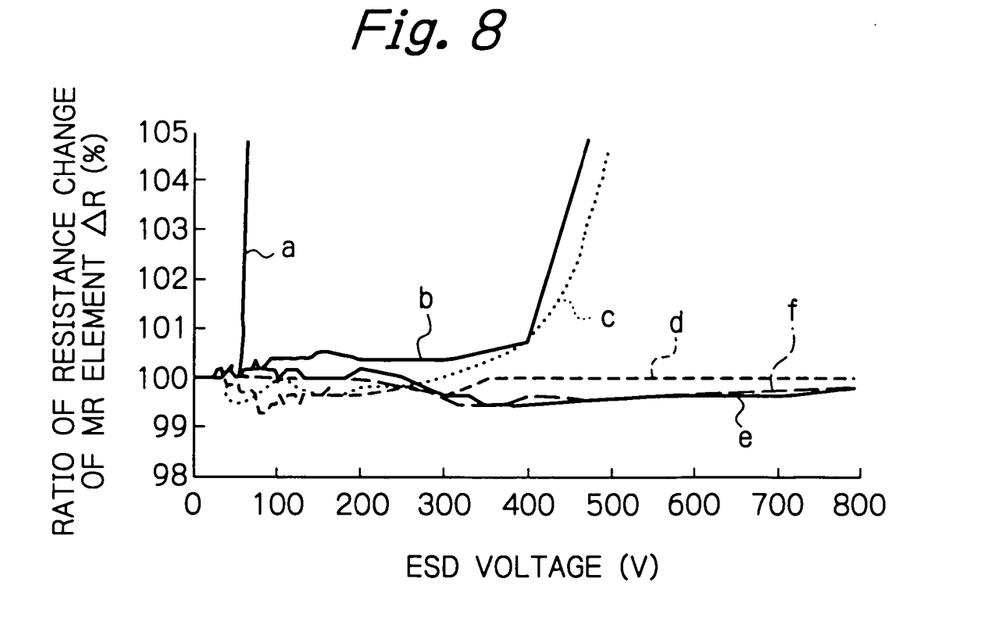
FIG. 8 is a graph illustrating resistance changing rate ΔR versus ESD voltage characteristics of a spin valve MR element.

FIGS. 7 and 8 illustrate output voltage versus ESD voltage characteristics and resistance changing rate ΔR versus ESD voltage characteristics of a spin valve MR element, respectively. In these figures, a indicates characteristics of a head suspension assembly with no diode element connected to the MR element, each of b to d indicates characteristics of a head suspension assembly with one diode element connected in parallel with the MR element toward one direction like the conventional art, and each of e and f indicates characteristics of a head suspension assembly with two diode elements connected in parallel with the MR element toward one direction like this embodiment. Used ESD simulator is pseudo Human Body Model ($R_{SIMU}$=1500 Ω, C=100 pF).

As will be apparent from FIG. 7, when no diode element is connected to MR element (in case of a) or when only one diode element is connected in parallel with the MR element toward one direction (in case of b, c or d), pin-inversion of the MR element occurred and the output voltage reversed on comparatively low ESD voltage (about 70 V or less). On the other hand, when two diode elements are connected in parallel with the MR element toward one direction (in case of d or e), pin-inversion does not occur until ESD voltage becomes quite high (about 250 V) and therefore the MR element does not easily receive magnetic damage.

Also, as will be apparent from FIG. 8, when no diode element is connected to MR element (in case of a) or when one diode element is connected in parallel with the MR element toward one direction (in case of b, c or d), ESD destruction which invites partial dissolution of the MR element and changes its resistance value occurred by ESD current on comparatively low ESD voltage (about 400 V). On the other hand, when two diode elements are connected in parallel with the MR element toward one direction (in case of d or e), ESD destruction did not occur even if ESD voltage becomes more than 800V.

In addition, it should be noted that the amount of applied energies at which pin-inversion of a spin-valve MR element occurs is very low as compared with that of ESD destruction (about ¼ or less), and therefore it is impossible to prevent any pin-inversion of the spin-valve MR element with the conventional technology for preventing ESD destruction.

As described above, according to this embodiment, since the two diode elements are connected in parallel with the spin valve MR element toward one direction, degradation of the electromagnetic conversion characteristics and ESD destruction by ESD current can be effectively prevented. Moreover, since these diode elements are formed into one IC chip with the drive circuit, safety measure against ESD problems can be provided without increasing the number of components.

The electrostatic charge on a worker's human body in manufacture and assembly processes of a head suspension assembly will invade in many cases from connection conductors between a magnetic head element and a head drive circuit formed by an IC chip or others. Thus, if the IC chip equipped with such diode elements is mounted on a suspension, protection against ESD current will be given in the position near a magnetic head element resulting that improved safety measure against ESD problems can be expected.

Although the embodiment mentioned above is related with the safety measure against ESD problems in a spin valve MR element, the present invention can be applied to the safety measure against ESD problems in another GMR element, a TMR element and an inductive element.

Figure 9:
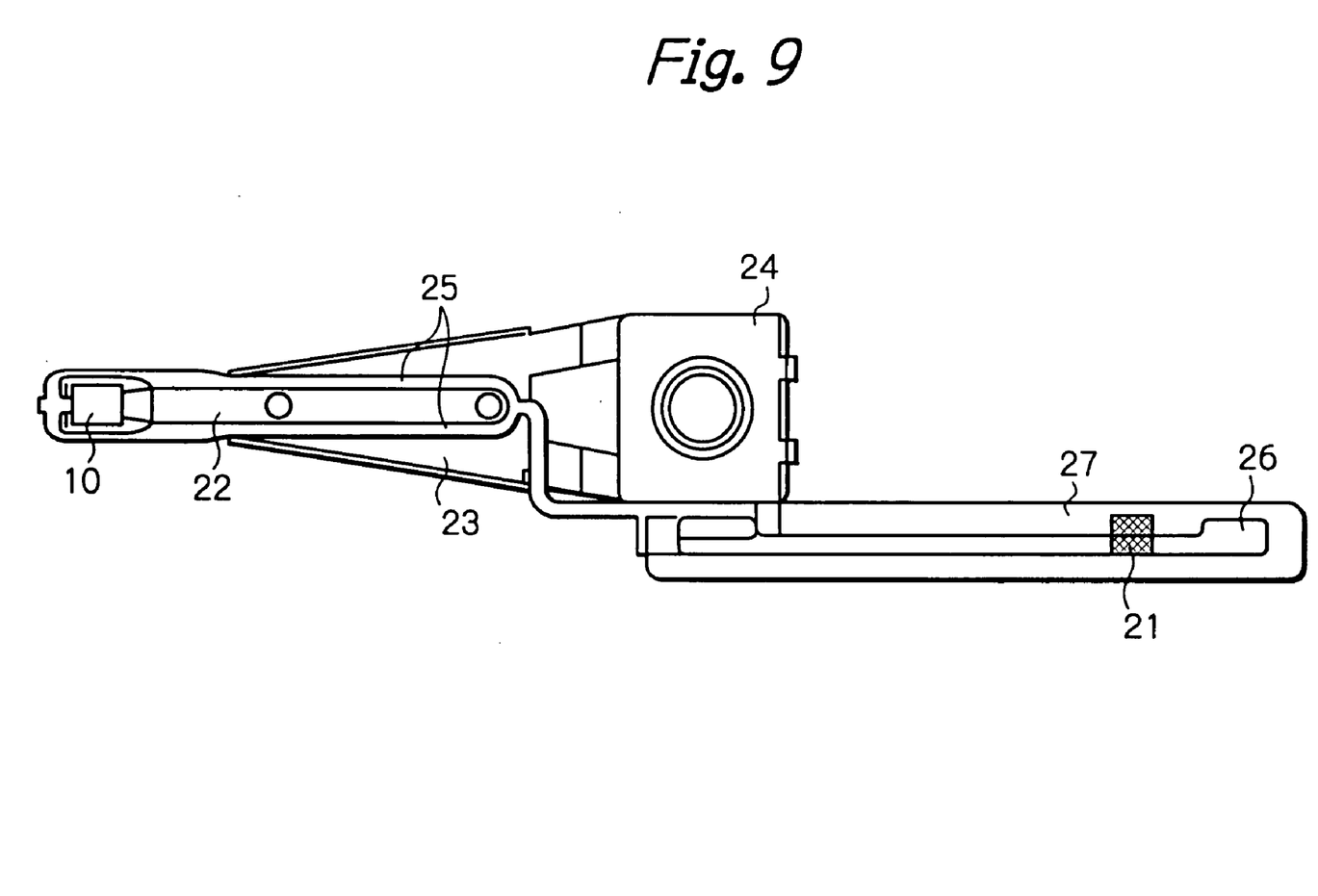
FIG. 9 is a plane view showing a whole head suspension assembly in another embodiment according to the present invention.

FIG. 9 shows a whole head suspension assembly with a composite type magnetic head in another embodiment according to the present invention.

As shown in the figure, in this embodiment, a FPC 27 which has lead conductors 25 is extended from the back end of a suspension, and an IC chip 21 is mounted on this FPC 27. That is, although the IC chip 21 is mounted on the suspension in the embodiment of FIG. 2, in this embodiment, it is not mounted on the suspension but on the FPC 27. Other constitution, operations and advantages in this embodiment are almost the same as those of the embodiment of FIG. 1.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head suspension assembly comprising:
   a magnetic head slider with at least one thin-film magnetic head element;
   a support member for supporting said magnetic head slider at a top end portion thereof;
   a drive circuit electrically connected to said at least one thin-film magnetic head element; and
   at least two diode elements connected with the same polarity in parallel with each other and in parallel with terminals which are connected across said at least one thin-film magnetic head element, each of said diode elements having a turn-on voltage higher than the maximum output voltage of said at least one thin-film magnetic head element.

2. A head suspension assembly as claimed in claim 1, wherein each of said diode elements is a diode element having a turn-on response speed sufficient to prevent leakage of an electrostatic discharge current from causing pin-inversion in the at least one thin-film magnetic head element.

3. A head suspension assembly as claimed in claim 1, wherein said drive circuit and said at least two diode elements are formed within an IC chip.

4. A head suspension assembly as claimed in claim 3, wherein said IC chip is mounted on said support member.

5. A head suspension assembly as claimed in claim 3, wherein assembly further includes a printed circuit board extended from said support member, and wherein said IC chip is mounted on said printed circuit board.

6. A head suspension assembly as claimed in claim 1, wherein said at least one thin-film magnetic head element includes a magnetoresistive effect element.

7. A head suspension assembly as claimed in claim 6, wherein said magnetoristive effect element is in anisotropic magnetoresistive effect element.

8. A head suspension assembly as claimed in claim 6, wherein said magnetorestive element is a giant magnetoresistive effect element.

9. A head suspension assembly as claimed in claim 6, wherein said magnetoresistive effect element is a tunneling magnetoresistive effect element.

10. A head suspension assembly as claimed in claim 1, wherein said at least one thin-film magnetic head element includes an inductive recording element and a magnetoresistive effect reproducing element.

11. A head suspension assembly as claimed in claim 10, wherein said magnetoresistive effect element is an anisotropic magnetoresistive effect element.

12. A head suspension assembly as claimed in claim 10, wherein said magnetoresistive effect reproducing element is a giant magnetoresistive effect element.

13. A head suspension assembly as claimed in claim 10, wherein said magnetoresistive effect reproducing element is a tunneling magnetoresistive effect element.

* * * * *